(12) United States Patent
Gan et al.

(10) Patent No.: US 7,486,430 B2
(45) Date of Patent: Feb. 3, 2009

(54) SINGLE-CRYSTAL-SILICON 3D MICROMIRROR

(75) Inventors: Chih Kiong Terence Gan, Singapore (SG); Ajay Agarwal, Singapore (SG); Janak Singh, Singapore (SG); Xiaolin Zhang, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 21 days.

(21) Appl. No.: 11/345,891

(22) Filed: Feb. 2, 2006

(65) Prior Publication Data

US 2006/0141659 A1 Jun. 29, 2006

Related U.S. Application Data

(62) Division of application No. 10/742,120, filed on Dec. 19, 2003, now Pat. No. 7,091,057.

(51) Int. Cl.
*G02B 26/00* (2006.01)
*G02B 26/08* (2006.01)
(52) U.S. Cl. ...................... 359/290; 359/224
(58) Field of Classification Search ............ 359/198, 359/214, 224, 290, 298
See application file for complete search history.

(56) References Cited

U.S. PATENT DOCUMENTS

| 6,480,320 | B2 * | 11/2002 | Nasiri ...................... 359/291 |
| 6,639,713 | B2 * | 10/2003 | Chiu et al. .................. 359/318 |
| 2004/0160118 | A1 * | 8/2004 | Knollenberg et al. .... 303/113.1 |

* cited by examiner

*Primary Examiner*—William C Choi
(74) *Attorney, Agent, or Firm*—Saile Ackerman LLC; Stephen B. Ackerman

(57) ABSTRACT

In a 3D free space micromirror device, a mirror plate is joined with actuators through flexible springs where the other ends of the actuators have fixed support on the substrate. Single crystal silicon and aluminum are used as bi-morph materials with silicon dioxide providing electrical isolation between the two. Thickness variation in the microstructure is achieved by two-step p-n junction formed in a p-type substrate. Thick and thin n-silicon layer formation and DRIE cut mechanisms are employed in such a way that all the thick and thin silicon components of the structure are released simultaneously avoiding overetch which can be detrimental to the thin flexural springs. Working prototypes of the device have been found suitable for any optical switching array architecture where deflections up to 10 degrees are required.

26 Claims, 9 Drawing Sheets

SINGLE-CRYSTAL-SILICON 3D MICROMIRROR

This is a division of patent application Ser. No. 10/742,120, filing date Dec. 19, 2003 now U.S. Pat. No. 7,091,057, Single-Crystal-Silicon 3D Micromirror, assigned to the same assignee as the present invention, which is herein incorporated by reference in its entirety.

BACKGROUND OF THE INVENTION

1) Field of the Invention

The invention relates to a method of manufacturing a 3D micromirror, and more particularly, to a method of manufacturing a 3D micromirror using a silicon micro-machining process.

(2) Description of the Prior Art

Micromirror devices based on MEMS technology had a humble debut in the late eighties as display devices. However, a spurt in research activities took place in the mid to late nineties after they were identified as most promising candidates for futuristic all-optical communication networks. There are two basic configurations for micromirror arrays based on MEMS technology, namely 2D in-plane and 3D free space out of plane. This division is based on MEMS silicon process technology. The 3D free space switching array is more efficient than the 2D configuration because it requires a smaller number of mirrors for a similar cross switching function. However, it is more challenging from a packaging and fiber coupling alignment point of view. The requirement for other parameters such as surface reflectivity, curvature, switching speed, cross talk, etc., is similar in both configurations.

There has been some recent work on 3D free space MEMS micromirror technology. Single crystal silicon material is a natural choice for high reliability, very good polished surface, and better flatness. U.S. Pat. No. 6,563,106 to Bowers et al and U.S. Pat. No. 6,556,737 to Miu et al disclose mirrors fabricated from thick single crystal silicon and actuators fabricated from thin single crystal silicon. The actuators of Bowers et al are electrostatic and parallel plate actuators requiring high voltage. Miu's actuators are electromagnetic. U.S. Pat. No. 6,504,643 to Peeters et al has a single crystal silicon mirror and MoCr electrostatic and parallel plate actuators requiring high voltage. U.S. Pat. No. 6,480,320 to Nasiri describes thick single crystal silicon mircomirrors and silicon-on-insulator (SOI) single crystal silicon electrostatic and parallel plate actuators requiring high voltage. Other materials can be used to fabricate micromirrors. For example, U.S. Pat. No. 6,386,716 to Hagelin et al shows polysilicon micromirrors and electrostatic actuators requiring high voltage.

The article "Micromirrors for Adaptive-optics Arrays" by Michael A. Helmbrecht et al, *Transducers '01 Eurosensors XV*, June 2001, describes micromirrors built using wafer bonding techniques. The article "Three-dimensional structures obtained by double diffusion and electrochemical etch stop" by S. Marco et al, *Journal of Micromech. Microeng.* 3 (1993) pp. 141-142, shows a two-step silicon layer method of forming non-uniform diaphragms and bridges. This disclosure does not anticipate using the two-step silicon method to build a 3D micromirror device. There is no recognition of the need to prevent breakage by cutting thick silicon having thinner edges.

SUMMARY OF THE INVENTION

A principal object of the present invention is to provide an effective and very manufacturable method of fabricating a 3D free space micromirror device.

Another object of the invention is to provide a 3D free space micromirror device having a thick silicon micromirror and thin silicon springs and thermal actuators.

A further object of the invention is to provide a method for fabricating a 3D free space micromirror device monolithically from a single crystal silicon substrate.

In accordance with the objects of this invention a single crystal silicon micromirror device is achieved. The three-dimensional free space micromirror device comprises a single crystal silicon micromirror, single crystal silicon thermal actuators, and single crystal silicon flexible springs connecting the thermal actuators to the micromirror.

Also in accordance with the objects of this invention a method of fabricating a single crystal silicon micromirror device is achieved. A p-doped single crystal silicon substrate wafer is provided having a frontside and a backside. First and second n-doped regions are formed at a surface of the substrate wherein the first n-doped regions have a first thickness and the second n-doped regions have a second thickness larger than the first thickness. A hard mask is formed on the backside of the wafer. An oxide layer is formed on the frontside of the wafer. An aluminum layer is formed on the thermal oxide layer and patterned to leave aluminum overlying some of the second n-doped regions to form thermal actuators and to form an oxide mask for actuator springs over portions of the first n-doped regions. A dielectric layer is deposited overlying the patterned aluminum layer and the thermal oxide layer. A metal layer is deposited overlying the dielectric layer and patterned to form bond pads to the thermal actuators contacting the patterned aluminum layer through openings in the dielectric layer and to form reflecting mirror surfaces overlying others of the second n-doped regions not covered by the patterned aluminum layer to form micromirrors. The substrate is etched away from the backside of the wafer stopping at the first and second n-doped regions. Then the wafer is diced into mirror array chips. The dielectric layer is etched away from the frontside of the wafer to expose portions of the first n-doped regions. The exposed first n-doped regions not covered by the oxide mask are etched away from the frontside to form flexible springs in the first n-doped regions wherein the second n-doped regions covered by the patterned aluminum layer form thermal actuators and wherein the flexible springs connect the micromirrors to the thermal actuators.

BRIEF DESCRIPTION OF THE DRAWINGS

In the accompanying drawings forming a material part of this description, there is shown.

DESCRIPTION OF THE PREFERRED EMBODIMENTS

The present invention discloses a novel design and process for making a 3D free space micromirror device with thick mirror and thin flexible springs and actuators which are monolithically fabricated from a single crystal silicon substrate. Key features of the present invention include the use of 1) a thermal actuator fabricated by a unique process sequence, 2) thin silicon for springs and the actuator and thick silicon for the mirror plate, 3) one monolithic process sequence for fabrication of the actuator, spring, and mirror, and 4) five masking steps, making the process simple and less cumbersome. Silicon is the core material for all components. Silicon dioxide and aluminum are used respectively for electrical isolation and thermal actuation purposes only.

Figure 1:
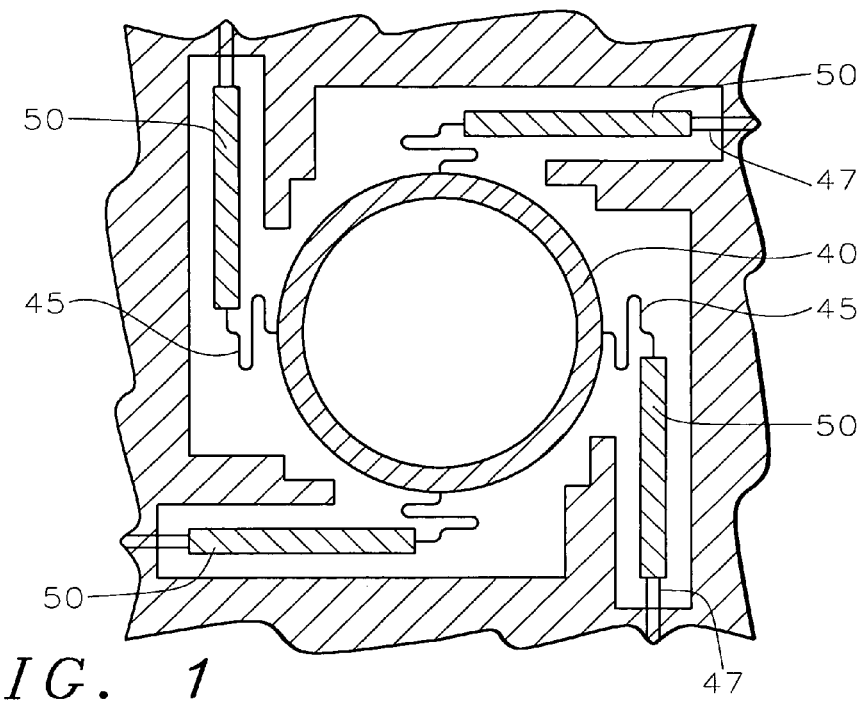
FIG. 1 schematically illustrates in top view a single crystal silicon micromirror device of the present invention.
Figure 2:
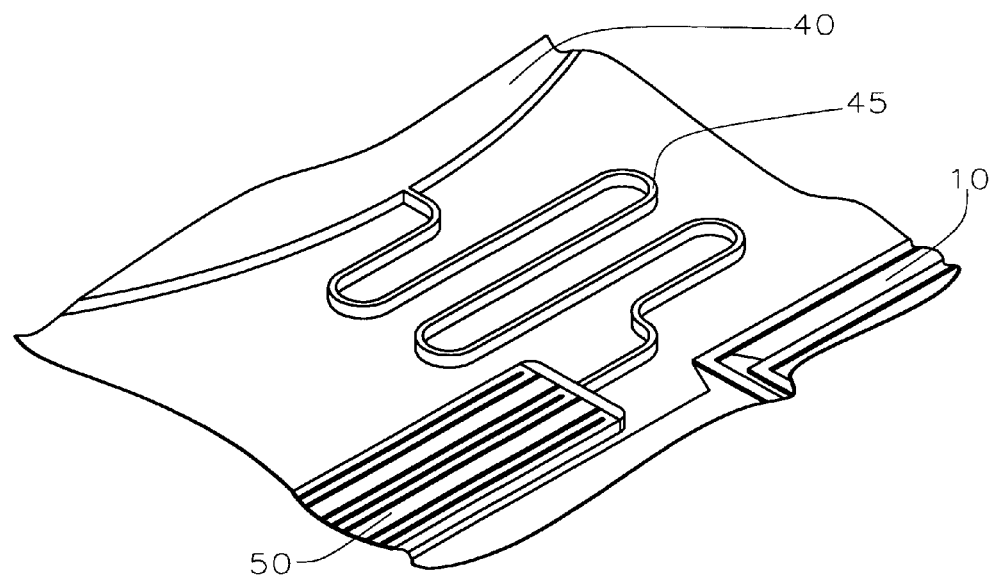
FIG. 2 schematically illustrates in a three dimensional view a single crystal silicon micromirror device of the present invention.

Top and three-dimensional views of the device can be seen in FIGS. 1 and 2, respectively. The mirror plate 40 is joined with actuators 50 through four flexural springs 45 at four corners symmetrically. Other ends of the actuators have fixed supports 47 on the substrate 10. For example, the mirror size is 400 microns in diameter and fabricated in 10 μm thick n-silicon. The actuators are 300 to 500 μm long multilayered composites of 2 μm thin silicon, 0.2 μm silicon dioxide, and 1 μm aluminum. The flexural springs are fabricated of 2 μm thin silicon. In the actuators, n-silicon and aluminum are bi-morph materials for thermal actuation/bending and the silicon dioxide provides electrical isolation between the two. Mirror sizes can range from 50 μm to 1000 μm in diameter depending on the application. Actuators can also be varied from 50 μm to 1000 μm if required.

There are many structures such as cantilever beam, doubly supported beam, diaphragm, complicated multi component structures, flexure springs etc. that are basic building blocks for MEMS devices. The process of the present invention offers thickness variation flexibility for single crystal silicon MEMS.

Figure 3:
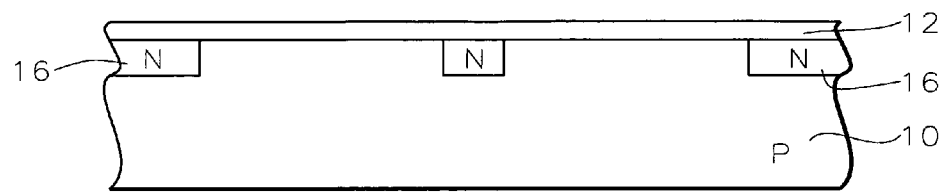
FIGS. 3 through 10 schematically illustrate in cross-sectional representation a preferred embodiment of the present invention.

The micromachining fabrication process begins with a p-type silicon substrate, for example, 6 inches in diameter. Referring now more particularly to FIG. 3, there is shown a cross-section of the semiconductor substrate 10, preferably composed of P-doped monocrystalline silicon. A portion of the active area of one mirror element is shown. A thermal oxide layer 12 is grown on the surface of the substrate to a thickness of between about 275 and 325 Angstroms.

Figure 4:
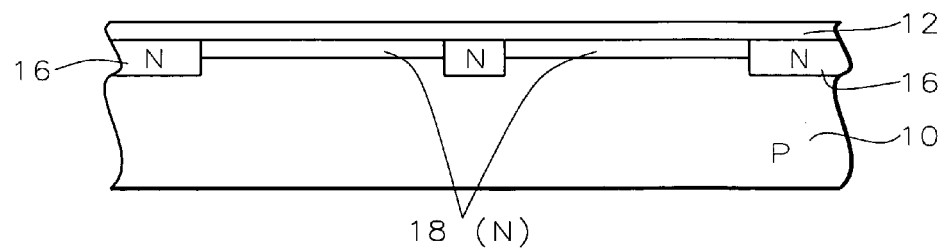

Phosphorus implantation and diffusion steps are used to obtain a two-step p-n junction having two different thicknesses. A first phosphorus implant is made through a mask, not shown. The impurity is diffused to a first depth, for example 8 μm, to form first diffusions 16. Now, a second global phosphorus implantation and diffusion are carried out for a shallower depth of about 2 μm to form second diffusions 18, as shown in FIG. 4. This forms the n-silicon layer with two thicknesses 2 μm and 8 μm.

Alternatively, an n-silicon layer can be grown on the p-substrate using an epitaxial silicon process. The n-silicon layer can be etched to form portions having different thicknesses using a deep reactive ion etching (DRIE) process.

Now, open frame implantations/diffusions are carried out for P+ and N+ contacts which are required for four electrode electrochemical (ECE) etch-stop at the n-silicon layer. These contacts are far away from the active area shown in the drawing figures and so are not illustrated.

Figure 5:
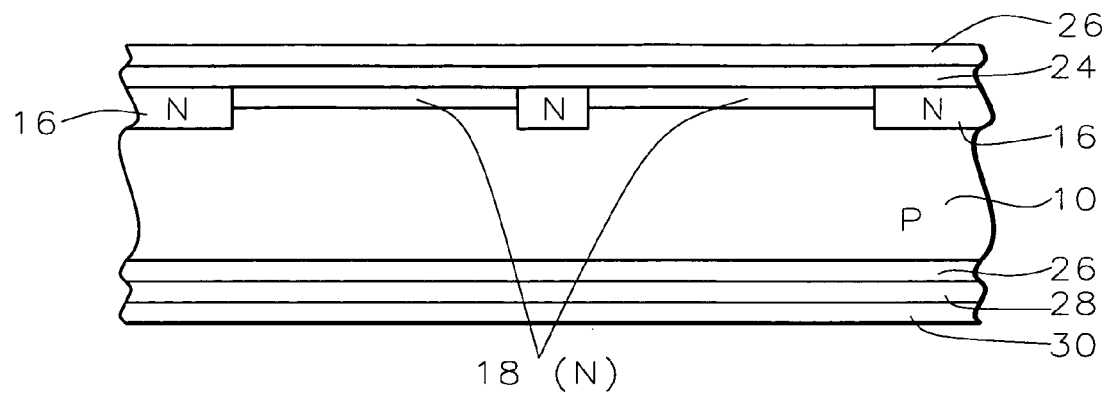

The oxide layer 12 is stripped, for example, by wet etching. Now a second thermal oxide layer 24 is grown on the surface of the substrate to a thickness of between about 270 and 330 Angstroms, as illustrated in FIG. 5. Next, a silicon nitride layer 26 is deposited by low pressure chemical vapor deposition (LPCVD) over the thermal oxide layer 24 on the frontside of the wafer and on the backside of the wafer (illustrated as the bottom of the drawing figure) to a thickness of between about 1200 and 1800 Angstroms. A TEOS oxide layer 28 is deposited by plasma enhanced chemical vapor deposition (PECVD) on the backside of the wafer to a thickness of between about 800 and 1200 Angstroms. A silicon nitride layer 30 is deposited by PECVD on the backside of the wafer to a thickness of between about 1500 and 2500 Angstroms. The oxide/nitride layer will act as a hard mask on the backside of the wafer.

Figure 6:
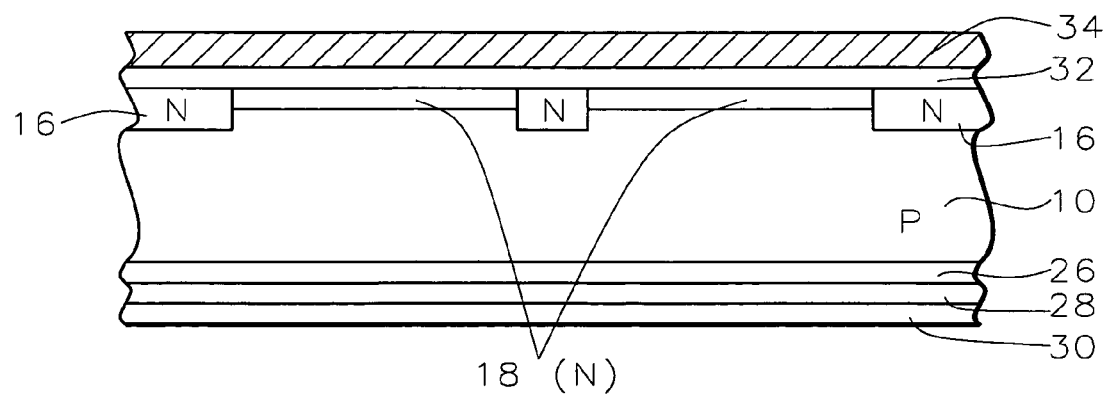

Referring now to FIG. 6, the oxide and nitride layers 24 and 26 are etched away on the frontside of the wafer. Now, a tetraethoxysilane (TEOS) oxide layer 32 is deposited on the frontside of the wafer by PECVD to a thickness of between about 1800 and 2200 Angstroms. An aluminum layer 34 is deposited over the TEOS oxide layer 32 on the frontside of the wafer to a thickness of about 1 μm. The TEOS oxide layer provides electrical isolation between the n-silicon and the aluminum film. Aluminum is used both as a bimorph material for thermal actuation and as a resistive heater.

Figure 7:
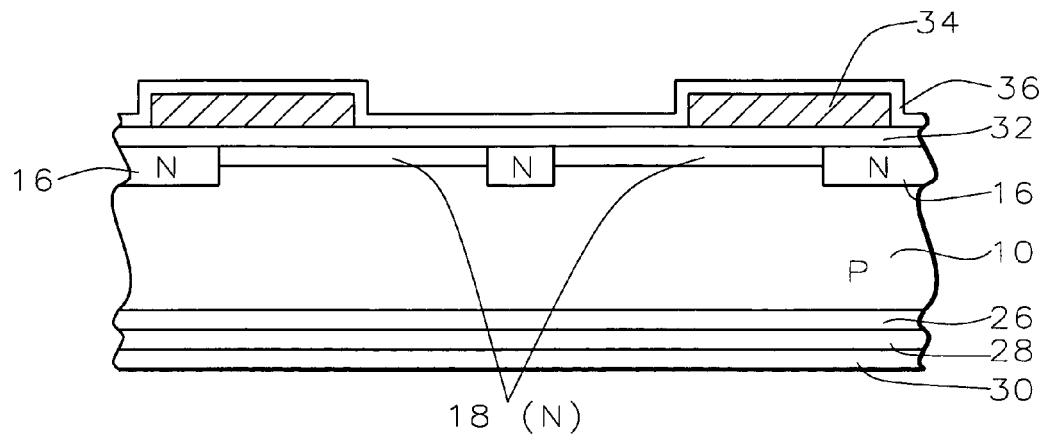
Figure 8:
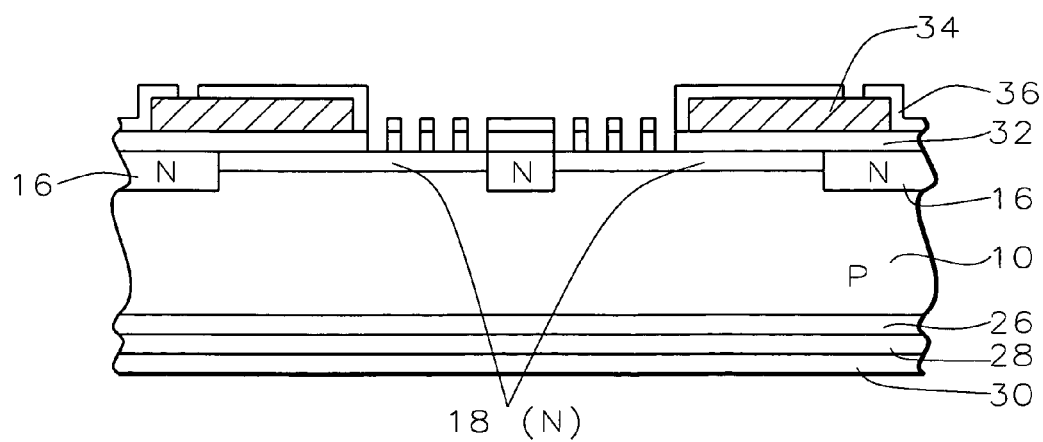

Using a second mask, the aluminum film 34 is patterned and etched, as illustrated in FIG. 7. A TEOS oxide layer 36 is deposited by PECVD on the patterned aluminum to a thickness of between about 4500 and 5500 Angstroms. Referring now to FIG. 8, the PETEOS layer 36 is patterned and etched using a third mask. This oxide layer 36 covers and passivates the previously patterned aluminum from the ambient and also is used as a hard mask in the subsequent silicon etching cut to define the device.

Figure 9:
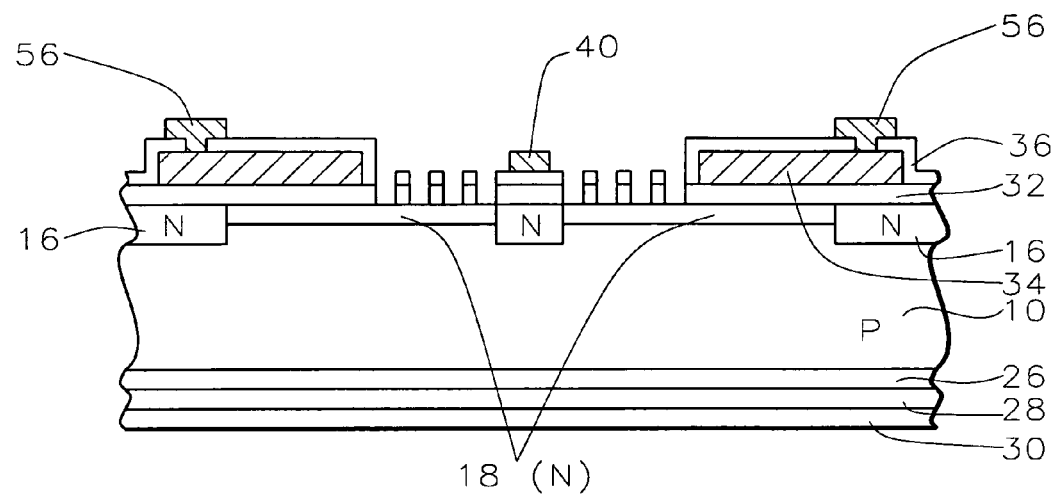

Referring now to FIG. 9, a layer of chromium is deposited over the substrate to a thickness of between about 100 to 200 Angstroms followed by deposition of a layer of gold having a thickness of between about 400 and 600 Angstroms. The two layers are patterned to form a mirror reflecting surface 40 and bonding pads 56.

Figure 10:
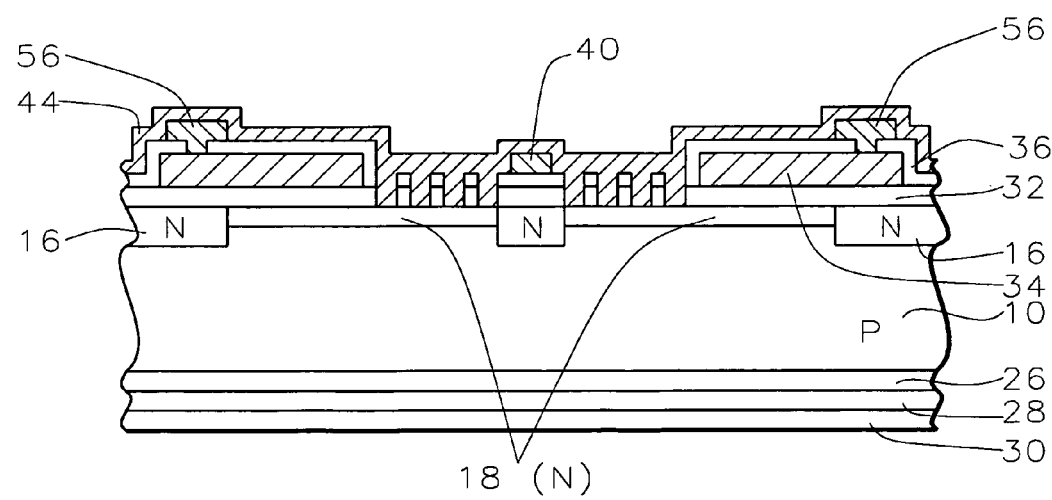
Figure 11:
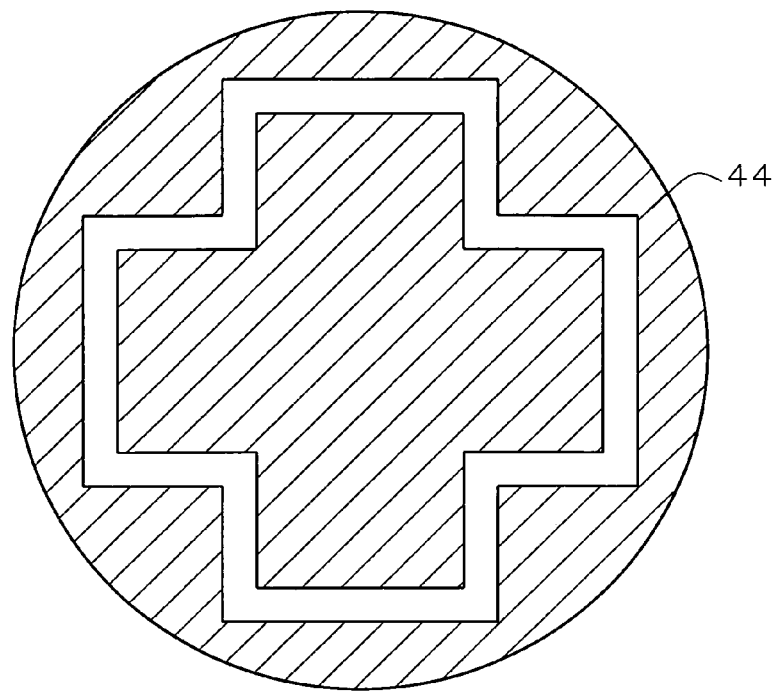
FIG. 11 schematically illustrates in top view a step in the process of the present invention.

Now, an aluminum thin film 44 is deposited for silicon electrochemical etch-stop (ECE) electrical contacts, as shown in FIG. 10. The aluminum film 44 is patterned using a paper mask to separate the n-silicon and p-silicon areas, as shown in top view in FIG. 11. This area is far away from the mirror active area.

Figure 12:
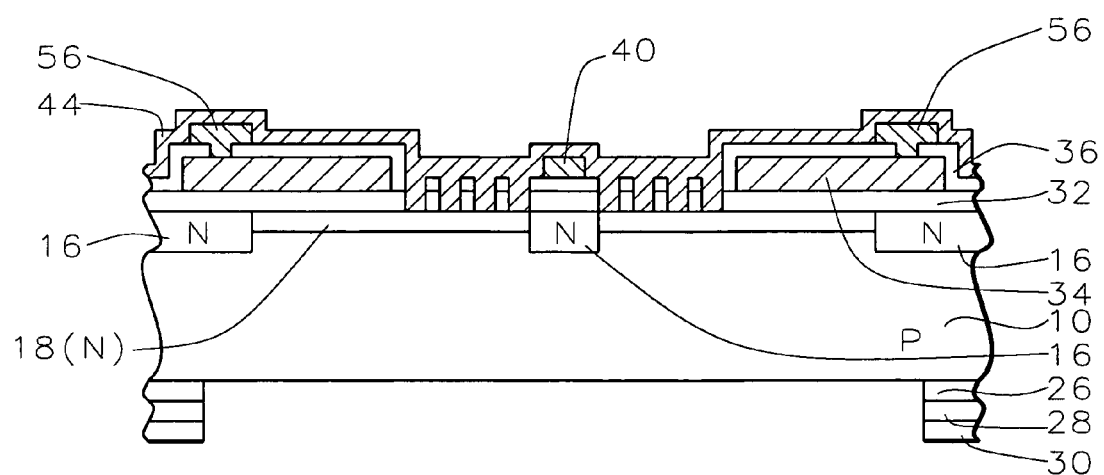
FIGS. 12, 13, 15 and 16 schematically illustrate in cross-sectional representation a preferred embodiment of the present invention.

The final masking step is performed to pattern the nitride/oxide/nitride layer 26/28/30 on the backside of the wafer as shown in FIG. 12.

Figure 13:
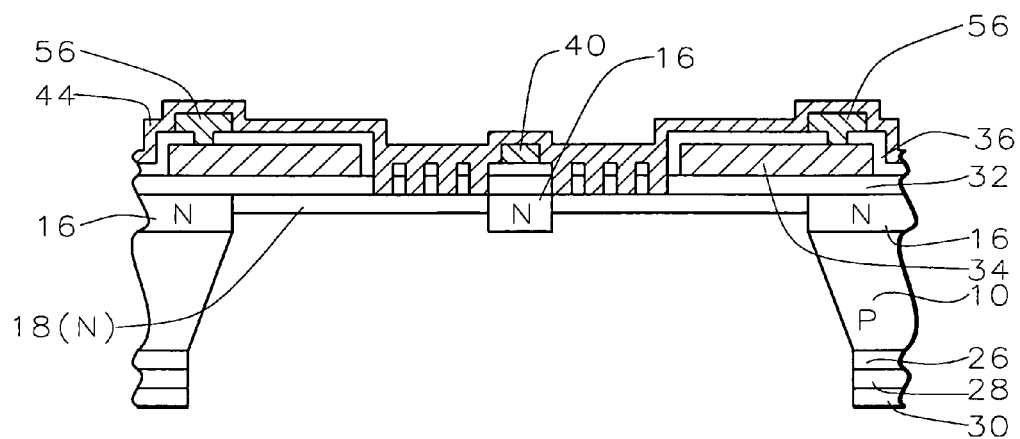

Now the processed wafer is ready for backside four probes ECE of silicon in an aqueous solution of KOH. Etching in KOH is carried out at about 75° C. for about 15 hours to etch through the wafer and stop at the n-silicon layer 16/18. During ECE, electrical potential is applied such that the p-silicon 10 is etched while etching stops on the n-silicon layer at the junctions 16 and 18. Etch stop on the n-silcion layer is detected by an electric current method. The etched wafer is shown in FIG. 13.

Figure 14:
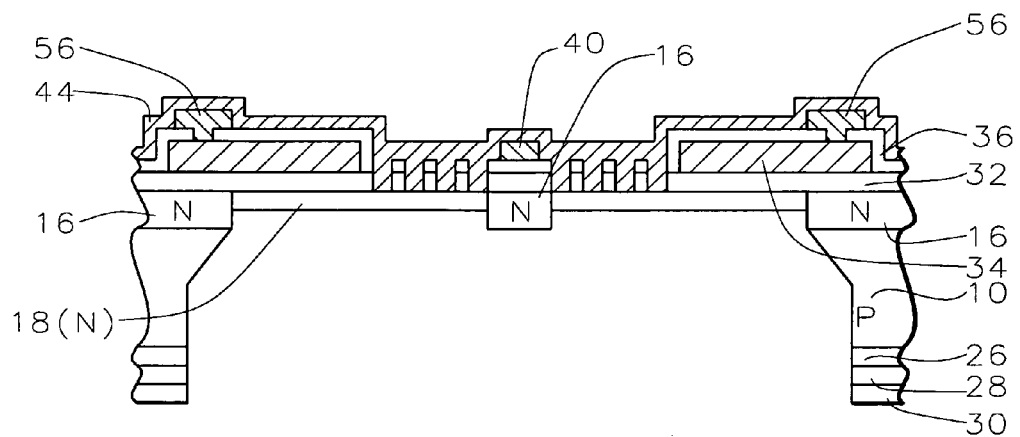
FIG. 14 schematically illustrates in cross-sectional representation an alternative in a preferred embodiment of the present invention.

In a process variation, a combination of DRIE and ECE KOH etching can be used. For example, in a silicon wafer of about 680 μm thickness, initial etching to a depth of about 600 μm is carried out without applying any electrical potential; that is, DRIE. The final 50-60 μm are etched using the 4 probes ECE method in aqueous KOH. The size of the DRIE window can be calculated using 54.7°, <111> plane slope in <100> oriented wafer. As shown in FIG. 14, the window size required for KOH is much larger than the size required for a combination of DRIE and KOH etch. For example, the savings in area can be large enough for one mirror element.

Figure 15:
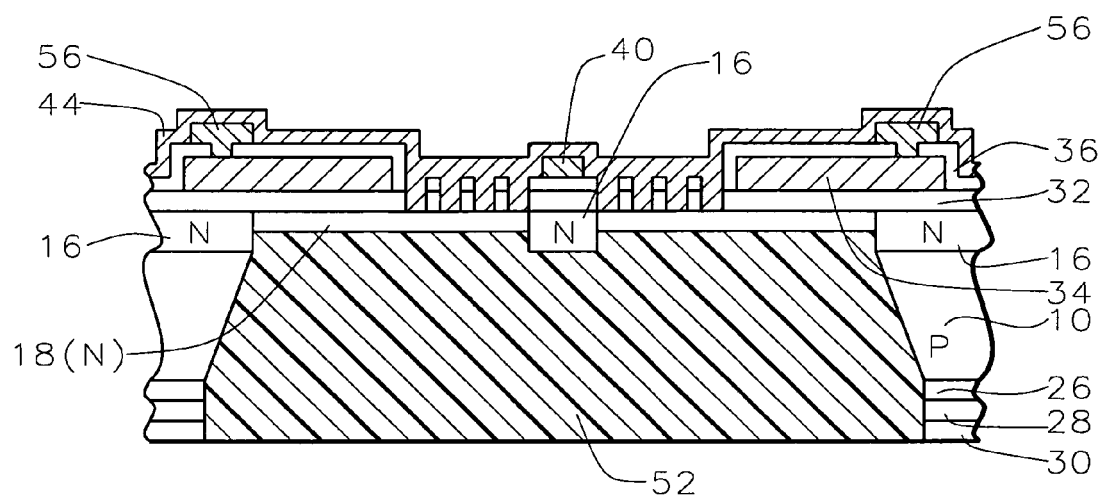
Figure 16:
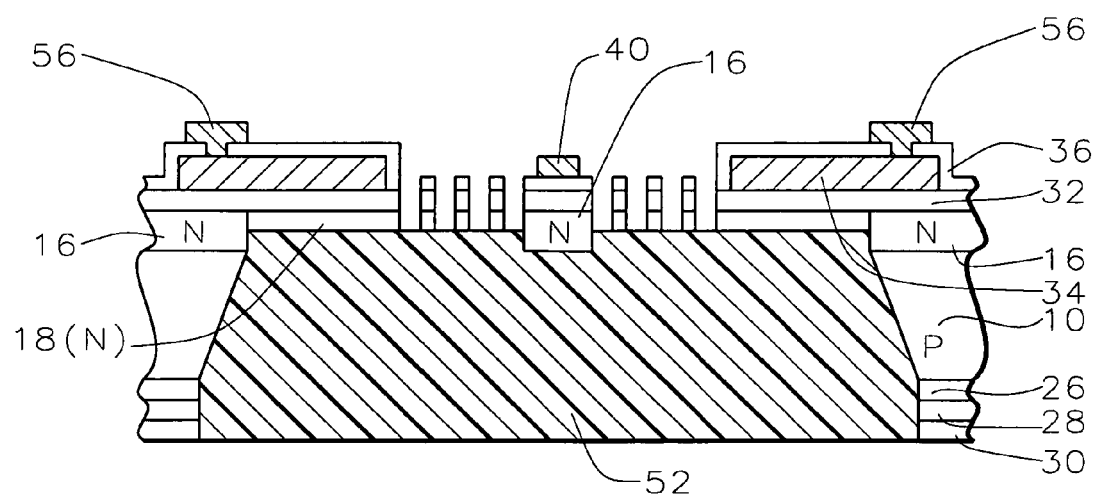

Referring now to FIG. 15, photoresist 52 is backfilled from the backside of the wafer. Its role is to protect the surface from contamination and provide some extra stiffness during dicing. Now, the processed wafer is diced into small mirror array chips. After dicing, the ECE metal 44 is stripped off the front side of the wafer. Then, the silicon 10 is cut through the silicon dioxide mask 32/36 as shown in FIG. 16 to realize the mirror array of devices. This step is preferably a deep reactive ion etching (DRIE) process. The two-step n-silicon diffusion was designed such that all components of the array devices are realized at the same time, thus avoiding overetching and further thinning of the flexural springs. In the design process, n-silicon used in the actuators and in the springs is about 2 μm thick; the edges of the thick mirror plate are also kept at 2 μm thick for achieving simultaneous release of the structure. This mechanism has proved to be very useful, resulting in a high yield of about 80%.

Figure 17:
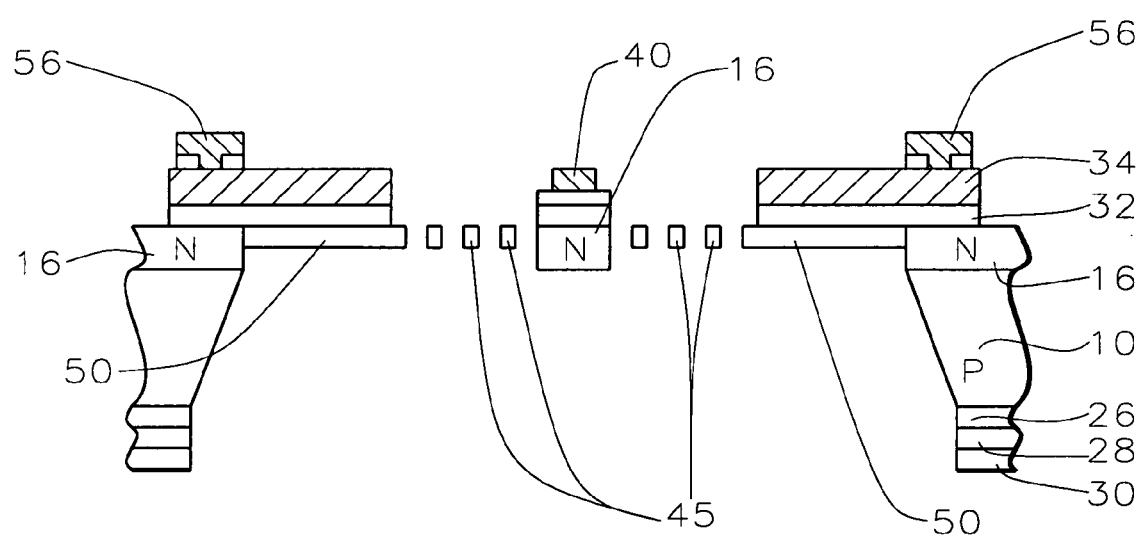
FIG. 17 schematically illustrates in cross-sectional representation a completed micromirror device of the present invention.

After photoresist strip and etching away of the silicon dioxide mask on the front side of the wafer, the completed device is shown in FIG. 17. Mirror 40, flexural springs 45, and bond pads 56 are shown. Bond pads are the areas where wire bonding is done for electrical connections. Actuator areas 50 consist of thin silicon-oxide-aluminum composite. A thermal actuator is a composite cantilever type structure where the difference in thermal expansion coefficient makes it bend due to change in temperature. In the current process, silicon, oxide, and aluminum are used to form this composite. There are many other thin films such as polycrystalline silicon, oxide, aluminum, gold, titanium, TiN, nickel etc., which can be used to form this composite structure. Oxide and aluminum will make an excellent combination for bi-morph thermal actuation. There can be many factors such as manufacturing capabilities, for choosing a particular combination. We need a single crystal silicon mirror plate so fabricating everything using silicon has been easier. Silicon is a better mechanical material, which adds to better reliability of the device.

In one embodiment of the invention, the mirror is thick and as the springs extend away from the mirror, the springs become progressively thinner. In an implemented process variation, the springs are fully thinner and the thickness variation from thick to thin is at the edge of the circular mirror plate. Wherever the silicon is cut to release structures, it is kept thinner to have uniform etching across all the structures. If there is one thickness, etching will be stopped at the same time and it will be uniform too.

The following Table 1 provides an overview of the properties of the design and experimental results.

TABLE 1

| Property | Description | Results |
| --- | --- | --- |
| 3D micromirror | The device is capable of deflecting light into 3-dimensional space; i.e. in x, y, and z. This is the maximum degree of motion possible of any micromirror device. | Up to +/−10 degrees deflection has been demonstrated. |
| Monolithic fabrication | The device is etched from a single silicon wafer. This exploits the defect-free single-crystal properties of silicon wafers to give the device superior strength and fatigue resistance. | Up to 10 million cycles actuation without failure has been demonstrated. |
| Non-uniform structure | Double-diffusion with 4-electrode electrochemical etch-stop was used to fabricate the non-uniform single-crystal structures. This allows us to simultaneously fabricate thick mirrors (for rigidity) and thin actuators and springs (for flexibility). In this way, the performance of different components of the micromirror can be optimized separately. | 2 micron thick actuators and springs and 10 micron thick mirrors have been fabricated. |
| 5 mask process | A lower mask count helps to lower the fabrication cost. | The device has been realized using 5 masks. |
| Single wafer process | A single wafer process helps to lower the fabrication cost and makes fabrication easier because wafer bonding is not needed. | The device has been realized using a single wafer process. |
| Low actuation voltage | This allows low-voltage control electronics to be used which are easier and cheaper to assemble. | Maximum deflection of about +−10 degrees can be obtained by operating the device at <2 volts. |
| Flat mirror | Flat mirrors are characterized by having a large radius of curvature. Flatter mirrors deflect light with less loss. | An average radius of curvature of 29 cm has been achieved. |
| Smooth mirror | Smooth mirrors deflect light with less loss. | An average RMS roughness of 7.15 nm has been achieved. |

The structure and process of the present invention have a number of advantages over the prior art:

1) Mechanical strength and reliability—single crystal silicon is inherently very insensitive to fatigue failure when subjected to high cyclic loads. It is also relatively stress-free and has high yield strength. Hence, the invention, whose moving parts are monolithically fabricated entirely out of single crystal silicon, is believed to be superior to the prior art in mechanical strength and reliability. The invention has been tested to 10 million cycles without failure.

2) Optimized performance—this method allows etching of the single crystal silicon to different thicknesses so that the thin flexible springs and actuators can be fabricated together with the thick mirrors. This is an improvement over micromirrors fabricated using SOI. In this way, the design of the mirror as well as the springs and actuators can be independently optimized for flatness and flexibility, respectively.

3) Simplicity and cost—the current invention can be realized with a 5 mask process on a single wafer, eliminating the need for wafer bonding. The simple design and fabrication method may result in better yield and measurable cost savings over the prior art.

4) Integration with electronics—the actuation voltage required for the thermal actuators is an order of magnitude less than that required for electrostatic actuators. This low voltage (<2 volts) makes it easier to integrate with control electronics.

5) Linearity—the angular deflection of the present invention has been shown to be linear with actuation voltage. This is an advantage over electrostatically actuated micromirrors which exhibit snap-in behavior.

The present invention provides a unique method of fabrication of a free space 3D micromirror device. The invention solves the problem of spring breakage by modifying the thick structure edges which are made of the same thickness as the thinner single crystal silicon structures. This suppresses overetching, thus leaving springs stronger as designed for better reliability. Simultaneous release of the structure in one monolithic process sequence is a key feature of the invention. The structure material for all components of the device is single crystal silicon. Silicon dioxide and aluminum have electrical and thermal roles only.

While the invention has been particularly shown and described with reference to the preferred embodiments thereof, it will be understood by those skilled in the art that various changes in form and details may be made without departing from the spirit and scope of the invention.

What is claimed is:

1. A three-dimensional free space micromirror device comprising:
    single crystal silicon micromirrors wherein each said micromirror comprises a reflecting surface on said single crystal silicon and a dielectric layer therebetween;
    single crystal silicon thermal actuators; and
    single crystal silicon flexible springs connecting said thermal actuators to said micromirrors wherein said thermal actuators allow said device to achieve a deflection angle of up to 10 degrees.

2. The device according to claim 1 wherein said reflecting surface comprises a layer of chromium having a thickness of between about 100 and 200 Angstroms and an overlying layer of gold having a thickness of between about 400 and 600 Angstroms.

3. The device according to claim 1 wherein said thermal actuators comprise an aluminum film overlying said single crystal silicon and having a silicon dioxide layer therebetween for electrical isolation.

4. The device according to claim 3 wherein said thermal actuators have a length of between about 300 and 500 microns, a silicon thickness of about 2 microns, a silicon dioxide thickness of 0.2 microns, and an aluminum thickness of about 1 micron.

5. The device according to claim 1 wherein said single crystal silicon forming said micromirrors, said thermal actuators, and said flexible springs is n-doped.

6. The device according to claim 1 further comprising bond pads connected to said thermal actuators wherein said thermal actuators are attached to fixed supports on a substrate through said bond pads.

7. The device according to claim 1 wherein each mirror element of said micromirror device comprises one micromirror joined with four of said thermal actuators through four of said flexible springs at four corners symmetrically and wherein each of said thermal actuators are attached to fixed supports on a substrate.

8. The device according to claim 1 wherein said micromirror has a diameter of between about 200 and 600 microns and a silicon thickness of about 10 microns and wherein edges of said micromirror are thinner than a central portion of said micromirror.

9. The device according to claim 8 wherein said flexible springs have a thickness of about 2 microns.

10. A three-dimensional free space micromirror device comprising mirror elements wherein each mirror element comprises:
    one single crystal silicon micromirror wherein said micromirror comprises a reflecting surface on said single crystal silicon and a dielectric layer therebetween;
    a single crystal silicon flexible spring at each of four corners of said micromirror; and
    four single crystal silicon thermal actuators, one joined to said micromirror through each of said flexible springs; and
    fixed supports on a substrate attached to each of said thermal actuators wherein said thermal actuators allow said device to achieve a deflection angle of up to 10 degrees.

11. The device according to claim 10 wherein said reflecting surface comprises a layer of chromium having a thickness of between about 100 and 200 Angstroms and an overlying layer of gold having a thickness of between about 400 and 600 Angstroms.

12. The device according to claim 10 wherein said thermal actuators comprise an aluminum film overlying said single crystal silicon and having a silicon dioxide layer therebetween for electrical isolation.

13. The device according to claim 12 wherein said thermal actuators have a length of between about 300 and 500 microns, a silicon thickness of about 2 microns, a silicon dioxide thickness of 0.2 microns, and an aluminum thickness of about 1 micron.

14. The device according to claim 13 wherein said flexible springs have a thickness of about 2 microns.

15. The device according to claim 10 wherein said single crystal silicon forming said micromirrors, said thermal actuators, and said flexible springs is n-doped.

16. The device according to claim 10 further comprising bond pads connected to said thermal actuators wherein said thermal actuators are attached to said fixed supports on said substrate through said bond pads.

17. The device according to claim 10 wherein said micromirror has a diameter of between about 200 and 600 microns and a silicon thickness of about 10 microns and wherein edges of said micromirror are thinner than a central portion of said micromirror.

18. A three-dimensional free space micromirror device comprising mirror elements wherein each mirror element comprises:
    one single crystal silicon micromirror;
    a single crystal silicon flexible spring at each of four corners of said micromirror; and
    four single crystal silicon thermal actuators, one joined to said micromirror through each of said flexible springs; and
    a bond pad on each of said thermal actuators wherein said thermal actuators are attached to fixed supports on a substrate through said bond pads.

19. The device according to claim 18 wherein said micromirror comprises a reflecting surface on said single crystal silicon and a dielectric layer therebetween.

20. The device according to claim 19 wherein said reflecting surface comprises a layer of chromium having a thickness of between about 100 and 200 Angstroms and an overlying layer of gold having a thickness of between about 400 and 600 Angstroms.

21. The device according to claim 18 wherein said thermal actuators comprise an aluminum film overlying said single crystal silicon and having a silicon dioxide layer therebetween for electrical isolation.

22. The device according to claim wherein said thermal actuators have a length of between about 300 and 500 microns, a silicon thickness of about 2 microns, a silicon dioxide thickness of 0.2 microns, and an aluminum thickness of about 1 micron.

23. The device according to claim 22 wherein said flexible springs have a thickness of about 2 microns.

24. The device according to claim 18 wherein said single crystal silicon forming said micromirrors, said thermal wherein actuators, and said flexible springs is n-doped.

25. The device according to claim 18 said micromirror has a diameter of between about 200 and 600 microns and a silicon thickness of about 10 microns and wherein edges of said micromirror are thinner than a central portion of said micromirror.

26. The device according to claim 18 wherein said thermal actuators allow said device to achieve a deflection angle of up to about 10 degrees.

* * * * *